March 29, 1955 P. P. GABY 2,705,314
MOUNTING DEVICE FOR SEISMIC WAVE RESPONSIVE APPARATUS
Filed Oct. 24, 1949

INVENTOR
Philip P. Gaby

BY: Walter G. Miller
Ralph L. Freeland Jr.
ATTORNEYS

United States Patent Office 2,705,314
Patented Mar. 29, 1955

2,705,314

MOUNTING DEVICE FOR SEISMIC WAVE RESPONSIVE APPARATUS

Philip P. Gaby, Calgary, Alberta, Canada, assignor, by mesne assignments, to California Research Corporation, San Francisco, Calif., a corporation of Delaware Application October 24, 1949, Serial No. 123,127

3 Claims. (Cl. 340—17)

The present invention relates to seismic prospecting, and more particularly to a mounting device for seismic wave responsive apparatus used in geophysical prospecting.

It has long been appreciated in the art of seismic prospecting that a rigid coupling between the earth under investigation and the geophones used in the reception of seismic waves must be obtained in order to produce a record of seismic waves arriving at the geophone truly representative of the waves reflected from subterranean layers of the earth. However, in the prior art it has been the practice to place the geophones or "jugs" on the ground without any constraining means other than the force of gravity wherever the surface layer of the earth is sufficiently compacted to permit this means of coupling. While it has been suggested that the geophone may be supported by a single spike or screw that can be driven into the ground sufficiently to contact a subterranean layer of the earth that is better compacted than the top of the ground, this expedient has been resorted to only when it is impossible to obtain a useable record with the geophones positioned on top of the earth. It has been further suggested in the prior art, but seldom followed in field practice, to bury the geophone under the top layer of the soil and tamp the backfill above the jug. The economic limitations on the last-mentioned method will be apparent in light of the fact that a geophysical prospecting crew is normally expected to make several hundred observations per day from individual geophones, each of which would require the digging and backfilling of holes for the placement of the geophone.

While any of the foregoing methods may be satisfactory for the observation of vertical vibrations arriving at the observation point, the herein above-mentioned methods of mounting a geophone have proved to be extremely unsatisfactory in the reception and observation of waves whose principal vibrations are essentially horizontal or are traveling at an arcute angle with the vertical. This is believed to be due in part to the fact that the force of gravity acts with the weight of the geophone as a restoring force against disturbances created by vertical vibrations. It will be apparent that the force of gravity cannot act as a restoring force when the disturbances are essentially horizontal vibrations. Since the vibrations are at right angles to the directions traveled, the desired vibrations to be picked up may be considered to be substantially in a horizontal plane. Furthermore, since it has been found that the horizontal vibrations to be recorded have an amplitude of substantially less than a millimeter, a single stake or screw does not afford a coupling between the earth and the geophone sufficiently rigid to make the wave responsive apparatus sensitive to vibrations of this amplitude.

Broadly, the present invention contemplates a support means for a geophone, or seismic wave responsive apparatus which is responsive to vibrations acting in a given direction in a substantially horizontal plane which comprises a base member, or body, having securing means for the wave responsive apparatus and a plurality of spaced earth, or ground, engaging means for rigidly coupling the base and the apparatus to the earth in the direction of the vibrations to be received by the apparatus.

It is accordingly an object of the present invention to provide a support for a geophone which will provide a directionalized coupling for a geophone for orienting the geophone in the direction of the horizontal waves to be received.

Another object is to provide a geophone support which is not dependent upon gravity as a restoring force to cause the vibration-responsive element accurately to follow the minute displacements of the earth set up by the reflected seismic waves.

It is a further object of the present invention to provide a support for a geophone which may be quickly and positively coupled to the ground and oriented in the direction of the waves to be received by the geophone so mounted.

Further objects and advantages of the present invention will be apparent from the following detailed description taken in conjunction with the drawing which forms a part of the annexed specification.

Figure 1:
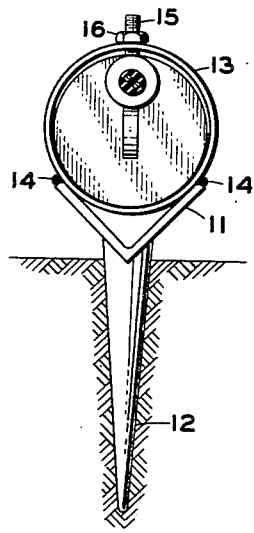
Fig. 1 is an end view of one form of a supporting device in accordance with the present invention showing the geophone mounted therein.
Figure 2:
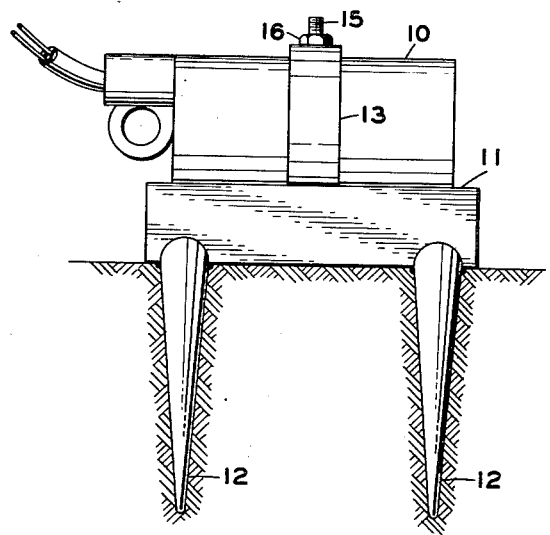
Fig. 2 is a plan view of the embodiment shown in Fig. 1 showing the supporting device mounted on the earth's surface.

Referring now to the drawing, and in particular to the embodiment of the present invention shown in Figs. 1 and 2, there is shown a geophone, or vibration pick-up unit 10, of conventional design and in extensive use in the field of geophysical prospecting. While the geophone 10 illustrated in connection with the present invention is that most commonly used in seismic prospecting, it will be apparent to those skilled in the art that any similar device or apparatus responsive to seismic waves and having its internal mechanism oriented for the reception of waves generated, or reflected, in such manner that the vibrations are essentially horizontal at the point of reception can be readily accommodated by a mounting device such as that contemplated in the present invention. Accordingly, the configuration of the geophone 10 is purely illustrative and not intended to be restrictive of the scope of the present invention.

As shown, geophone 10 is adapted to be seated on a base or body member 11, which in the configuration shown in Figs. 1 and 2 may be a section of right angle stock of any desirable metal. Base member 11 is in turn provided with a plurality of ground-engaging means which in the present embodiment are illustrated as a pair of tapered stakes 12 which are longitudinally spaced. The stakes, or spikes, 12, are preferably welded to the apex of the angle. In order to positively clamp geophone 10 to base member 11 so that any movement of the body member 11 by substantially horizontal forces will be directly transmitted to the geophone 10, I have provided a clamping ring 13 which is preferably secured to angle 11 by welds at the sides of the angle as shown at 14. It will be noted that ring 13 is of slightly greater diameter than geophone 10 so that the phone may be easily inserted and removed from the support means. In this arrangement a clamping screw 15 is threaded through a bore in the top of ring 13 and held secure therein by nut 16.

Figure 3:
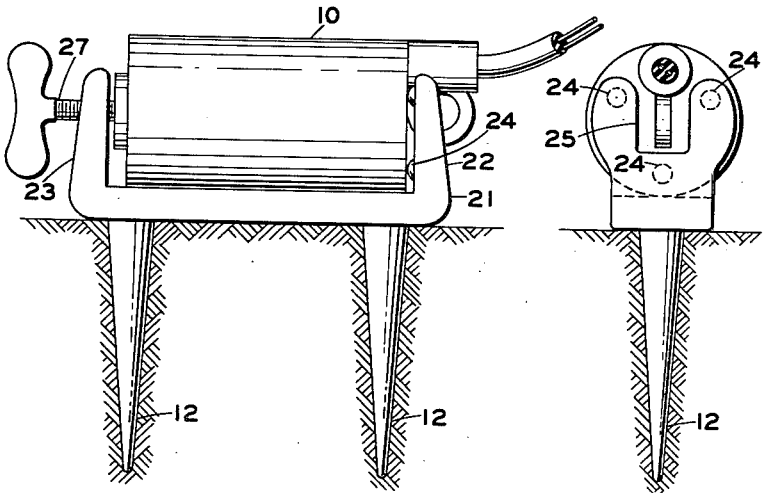
Fig. 3 is a plan view of an alternative embodiment of the supporting device similar to the apparatus shown in Fig. 2.
Figure 5:
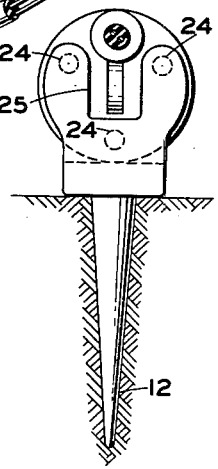
Fig. 5 is a right-hand end view of the device shown in Fig. 3.

Referring now to the alternative embodiment of the geophone-supporting device according to the present invention, shown in Fig. 3, it will be noted that the principal difference in this embodiment relates to the means mounting the geophone on the base member of the device. As shown, a base, or body, member 21 is provided with a pair of upwardly turned end members 22 and 23 which are spaced apart sufficiently to admit a conventional geophone 10 therebetween. End member 22 is provided with three mounting pads 24 which are adapted to abut one end of the geophone. It will also be noted that member 22 is provided with a slot 25 to permit the conventional handle of geophone 10 to pass through the end member.

Figure 4:
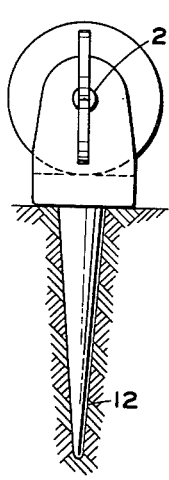
Fig. 4 is a left-hand end view of the embodiment shown in Fig. 3.
Figure 6:
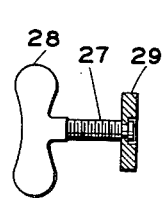
Fig. 6 is a detailed view of the thumbscrew clamping means shown in the embodiment illustrated in Fig. 3 and along the line in the direction of arrows 6—6 in Fig. 7.
Figure 7:
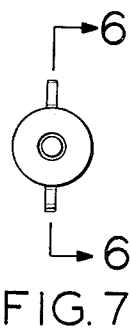
Fig. 7 is an end view of the clamping means shown in Fig. 6.

As best seen in Fig. 4, end member 23 is provided with a bore 26 which may be tapped with a suitable screw thread to admit thumbscrew 27. As illustrated in Fig. 6, thumbscrew 27 comprises a winged head 28 for manually tightening screw 27 and a base-engaging member 29 which is rotatably mounted on the end of screw 27 to permit the geophone to be quickly and securely mounted on the base member 21 by tightening screw 27.

Body member 21 is likewise provided with a pair of longitudinally spaced spikes, or stakes, 12, to permit the geophone mounting device to be oriented, and secured, to the earth. While the stakes 12 may have any desired configuration, I have found that the portion of the stake lying in the plane of the horizontal forces to be detected should make an angle of at least 90 degrees to the base member, and preferably greater than 90 so that the stakes diverge outwardly with respect to the base portion included between the stakes. By this arrangement, the uncompacted material in which the device is to be inserted may be at least slightly compacted between the stakes.

It will be apparent to those skilled in the art that the same rigid coupling in a directional sense may be accomplished by the addition of further stakes to the supporting members for the geophone. For example, if further rigidity were desired, it would be possible to add a third stake to the base members 11, or 21, either in the same plane as the stakes shown in the drawings, or so arranged that a triangular base was provided which could be oriented in the direction of the horizontal forces to be detected by the geophone 10. It will likewise be apparent that other securing mans for the geophone or seismic wave responsive apparatus may be provided, since this is well within the skill of the art. In particular, it would be possible to attach the stakes 12 directly on the case of the geophone, or other body member which serves as a base member for the internal mechanism responsive to seismic waves.

In operation, the geophone 10 may be either removed from the base members 11 or 21 and the stakes 12 pressed down into the surface soil by hand, or by foot, so that the stakes are in substantial alignment with the direction of the forces to be received thereby. It will be apparent that if the soil is relatively soft, the geophone need not be removed therefrom, but the entire assembly may be forced toward the ground by hand to engage stakes 12 in the desired position.

While further modifications and changes in the arrangement of the clamping means and the configuration of the stakes and their arrangement upon the base members will be apparent to those skilled in the art, all such modifications and changes as fall within the scope of the appended claims are hereby included.

I claim:

1. A device comprising elongated vibration pick-up means responsive to a component of seismic wave energy substantially parallel to the earth's surface, a longitudinally extending body member for longitudinally supporting said means and at least a pair of longitudinally spaced ground-engaging stakes for directionally orienting the coupling of said means in a plane substantially horizontal to the earth's surface.

2. A device as recited in claim 1 wherein said stakes diverge outwardly from said body member to effect compaction of the ground between said stakes upon introduction thereof into the ground to thereby improve the coupling between the vibration pick-up means and the ground.

3. In combination with a geophone responsive to a component of seismic wave energy substantially parallel to the earth's surface and having an elongated supporting portion, an elongated base, clamping means for securing said geophone on said base with said base longitudinally supporting said geophone by said elongated support portion, and a plurality of longitudinally spaced ground engaging stakes for rigidly coupling said base to the earth.

References Cited in the file of this patent

UNITED STATES PATENTS

| | | |
|---|---|---|
| 561,857 | Baxter | June 9, 1896 |
| 807,613 | Graves | Dec. 19, 1905 |
| 925,680 | Burns | June 22, 1909 |
| 1,884,120 | Mross | Oct. 25, 1932 |
| 1,980,993 | Hayes | Nov. 20, 1934 |
| 2,077,668 | Bristol | Apr. 20, 1937 |
| 2,241,428 | Silverman | May 13, 1941 |
| 2,557,714 | Williams | June 19, 1951 |
| 2,592,780 | Woods | Apr. 15, 1952 |
| 2,610,240 | Pottorf | Sept. 9, 1952 |